United States Patent
Jeon et al.

(10) Patent No.: US 9,714,018 B2
(45) Date of Patent: Jul. 25, 2017

(54) SOLENOID VALVE FOR BRAKE SYSTEM

(71) Applicant: MANDO CORPORATION, Gyeonggi-do (KR)

(72) Inventors: In-Wook Jeon, Seoul (KR); I-Jin Yang, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/051,663

(22) Filed: Feb. 23, 2016

(65) Prior Publication Data
US 2016/0251008 A1 Sep. 1, 2016

(30) Foreign Application Priority Data
Feb. 27, 2015 (KR) .................. 10-2015-0027734

(51) Int. Cl.
*F16K 31/06* (2006.01)
*B60T 13/68* (2006.01)
(Continued)

(52) U.S. Cl.
CPC ............ *B60T 13/686* (2013.01); *B60T 8/363* (2013.01); *B60T 13/146* (2013.01);
(Continued)

(58) Field of Classification Search
CPC ...... B60T 13/686; B60T 8/363; B60T 13/662; B60T 13/146; B60T 15/36;
(Continued)

(56) References Cited

U.S. PATENT DOCUMENTS 3,013,768 A * 12/1961 La Mastra .......... F16K 31/0606
251/129.15
5,246,199 A * 9/1993 Numoto .............. F16K 31/0658
251/129.15
(Continued)

FOREIGN PATENT DOCUMENTS

JP 9-283331 10/1997
JP 2001-514365 9/2001
(Continued)

OTHER PUBLICATIONS

Notice of Allowance dated Mar. 31, 2016 for Korean Patent Application No. 10-2015-0027734 and its English summary provided by Applicant's foreign counsel.
(Continued)

*Primary Examiner* — John Bastianelli
(74) *Attorney, Agent, or Firm* — Ladas & Parry, LLP

(57) ABSTRACT

A solenoid valve for a brake system capable of reducing noise and vibration caused during operation of the solenoid valve. The solenoid valve includes a valve core, a valve dome, an armature, and a plunger. An upper surface of the armature is recessed to form an insertion recess, a buffer member buffers an impact between the armature and the valve dome, the buffer member includes a support part between the upper surface of the armature and the valve dome and buffers and supports the armature, and an insertion part connects to the support part and inserted into the insertion recess.

4 Claims, 7 Drawing Sheets

(51) Int. Cl.
  *H01F 7/08* (2006.01)
  *B60T 13/14* (2006.01)
  *B60T 13/66* (2006.01)
  *B60T 15/36* (2006.01)
  *B60T 8/36* (2006.01)

(52) U.S. Cl.
  CPC ............ *B60T 13/662* (2013.01); *B60T 15/36* (2013.01); *F16K 31/0655* (2013.01); *F16K 31/0689* (2013.01); *H01F 7/088* (2013.01); *H01F 2007/086* (2013.01)

(58) Field of Classification Search
  CPC .. F16K 31/0655; F16K 31/0689; H01F 7/088; H01F 2007/086
  USPC ......... 251/64, 129.02, 129.15; 335/257, 261, 335/277, 279; 303/119.2
  See application file for complete search history.

(56) References Cited

U.S. PATENT DOCUMENTS

| | | | | |
|---|---|---|---|---|
| 5,402,093 A | * | 3/1995 | Gibas | H01F 7/081 |
| | | | | 335/261 |
| 5,467,961 A | * | 11/1995 | Sausner | F16K 31/0696 |
| | | | | 251/129.15 |
| 5,503,366 A | * | 4/1996 | Zabeck | F16K 31/0606 |
| | | | | 251/129.15 |
| 5,718,489 A | | 2/1998 | Megerle et al. | |
| 6,019,344 A | * | 2/2000 | Engel | F16K 31/0696 |
| | | | | 251/129.01 |
| 6,065,734 A | * | 5/2000 | Tackett | B60T 8/363 |
| | | | | 251/129.15 |
| 6,105,931 A | * | 8/2000 | Frank | F16K 31/0606 |
| | | | | 251/129.15 |
| 6,453,930 B1 | * | 9/2002 | Linkner, Jr. | B60T 8/363 |
| | | | | 303/119.2 |
| 6,595,485 B2 | * | 7/2003 | Burrola | F16K 31/0696 |
| | | | | 251/129.15 |
| 6,679,567 B1 | * | 1/2004 | Tackett | B60T 8/363 |
| | | | | 303/119.2 |
| 6,805,331 B2 | * | 10/2004 | Burrola | F02M 25/0836 |
| | | | | 251/129.15 |
| 6,830,232 B2 | * | 12/2004 | Burrola | F02M 25/0836 |
| | | | | 251/64 |

FOREIGN PATENT DOCUMENTS

| | | |
|---|---|---|
| JP | 2009-24696 | 2/2009 |
| JP | 5191282 | 5/2013 |
| KR | 1996-7004741 | 10/1996 |
| KR | 2003-0067843 | 8/2003 |

OTHER PUBLICATIONS

Office Action dated Nov. 20, 2015 for Korean Patent Application No. 10-2015-0027734.

* cited by examiner

SOLENOID VALVE FOR BRAKE SYSTEM

CROSS-REFERENCE TO RELATED APPLICATION

This application claims the benefit of Korean Patent Application No. 2015-0027734, filed on Feb. 27, 2015 in the Korean Intellectual Property Office, the disclosure of which is incorporated herein by reference.

BACKGROUND

1. Field

Embodiments of the present invention relate to a solenoid valve for a brake system, and more particularly, to a solenoid valve for a brake system capable of reducing noise and vibration during an operation of the solenoid valve.

2. Description of the Related Art

An anti-lock braking system for a conventional vehicle senses a slip of a wheel and controls a brake pressure applied to the wheel thereby to prevent a locking of the wheel during braking.

Thus, the wheel is not slipped during the braking, and maintains an orientation, and thus a safe braking is performed.

The above brake system includes a plurality of solenoid valves configured to open or close a channel of a brake hydraulic line and control brake pressure. The solenoid valves includes a normal open type solenoid valve which maintains a default open state and a normal closed type solenoid valve which maintains a default closed state.

In order to increase a level of integration, a conventional normal open type solenoid valve is mounted in a modulator block, and a valve bore is processed by cutting so that a valve can be installed on a modulator block.

The valve bore is connected to an internal channel formed in the modulator block, and a valve core is simultaneously inserted and installed in the valve bore.

A cylindrical valve dome is connected to one end of the above valve core such that an armature installed in a hollow therein can be advanced and retreated. An integrally formed plunger is provided at an end portion of the armature such that, an orifice of the valve seat is opened or closed by advancing and retreating, and a return spring is installed between the plunger and the valve seat.

Meanwhile, a groove is formed on an outer surface of the armature in a longitudinal direction for a rapid response of the armature during an operation of the solenoid valve by applying a magnetic coil. Because of a decrease in oil hydraulic pressure due to the groove, the armature may rapidly move the plunger, and the plunger may block the orifice.

However, the rapid response of the armature is applied during returning, and the armature can collide with the valve dome.

PRIOR ART DOCUMENT

Prior Art Document 1: Korean Laid-open Patent Publication No. 1996-7004741 (Published on Oct. 9, 1996)

SUMMARY

Therefore, it is an aspect of the present invention to provide a solenoid valve for a brake system which is capable of decreasing a noise caused by a collision of an advancing and retreating armature with a valve dome by during operation of the solenoid valve.

Additional aspects of the invention will be set forth in part in the description which follows and, in part, will be obvious from the description, or may be learned by practice of the invention.

In accordance with one aspect of the present invention, in a solenoid valve for a brake system including a valve core having an inlet and an outlet, a valve dome configured to cover one end portion of the valve core, an armature provided to be advanced and retreated in the valve dome, and a plunger configured to open or close the inlet of the valve core based on the advance and retreat of the armature, wherein a buffer member configured to buffer an impact between the armature and the valve dome and provided between the armature and the valve dome is provided.

The buffer member may include a support part interposed between the upper surface of the armature and the valve dome and configured to buffer and support the armature, and a leg part inserted into the insertion recess provided on the upper surface of the armature.

A plurality of the leg parts may be provided and elastically deformed and fittingly press-inserted into the insertion recess.

An inner surface of the insertion recess may be provided to be inclined so that an inner diameter of the insertion recess may be decreased toward a lower portion thereof.

An outer diameter of the insertion part may be provided to be greater than a maximum inner diameter of the insertion recess as toward an upper portion thereof.

The leg part may be elastically deformed in the inner direction of the buffer member as inserted further into a lower portion of the insertion recess.

When the armature is moved in a lower direction, the leg part may be elastically restored and the support part may be separated from an upper surface of the armature, and when the armature is moved in an upper direction, the armature may be elastically deformed and press an inner surface of the insertion recess and be fittingly press-inserted, and the support part may be elastically pressurized between the armature and the valve dome.

The buffer member may be provided as an elastically deformable polyhedral body or a spherical body, and a lower portion of the buffer member may be inserted into the insertion recess provided on the upper surface of the armature.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
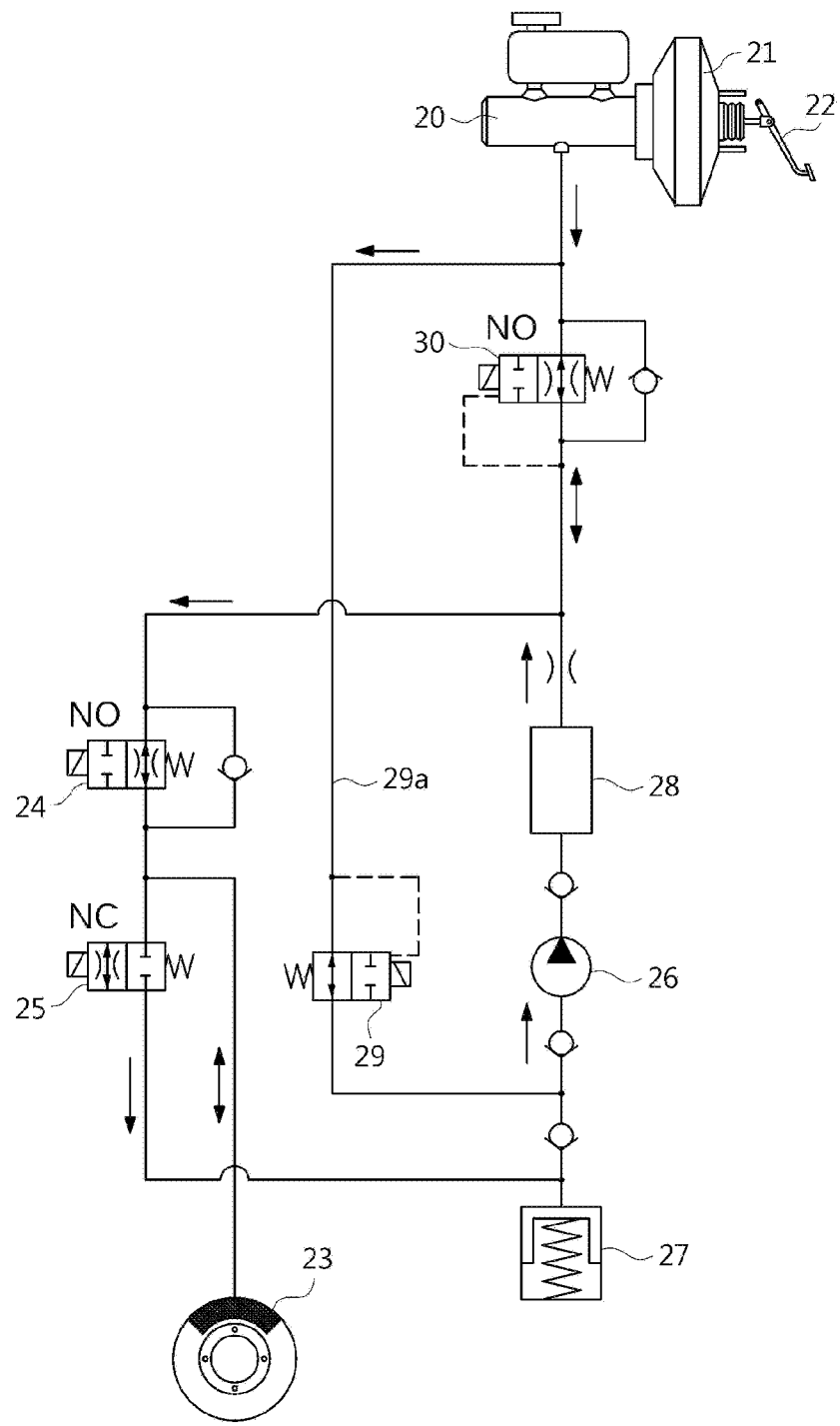
FIG. 1 is a circuit view schematically illustrating a hydraulic circuit of a brake system to which a solenoid valve for a brake system according to a first embodiment of the present invention is applied.

Hereinafter, embodiments of the present invention will be described in detail with reference to the accompanying drawings.

The embodiments described herein are only provided as examples so that a skilled person in the art of the present invention can fully appreciate the inventive concept of the present invention. The present invention should not be limited by the embodiments hereinafter, and the details thereof may be revealed in other forms. In order to clearly explain the present invention, irrelevant descriptions have been omitted from drawings, and widths, lengths, thickness, etc. of the constituent members in the drawings may be expressed exaggerated for convenience, FIG. 1 is a circuit view schematically illustrating a hydraulic circuit of a brake system in which a solenoid valve for a brake system according to a first embodiment of the present invention is applied.

As shown in FIG. 1, an anti-lock braking system (ABS) for an vehicle according to the present invention includes a normal open (NO) type solenoid valve 24, which is installed in a middle of a hydraulic line connecting a master cylinder 20 and a wheel side wheel cylinder 23 and configured to open or close a supply channel and also, a normal closed (NC) type solenoid valve 25 configured to open or close a channel of a fluid returning from the wheel side. Here, when the NO type solenoid valve 24 is opened, the NC type solenoid valve 25 is closed so that a brake pressure is applied to the wheel side, and when the NO type solenoid valve 24 is closed, the NC type solenoid valve 25 is opened so that the brake pressure of the wheel is released.

Also, the ABS includes a hydraulic pump 26 configured to repress the returning oil toward an upper side of the NO type solenoid valve 24, and a low pressure accumulator 27 and a high pressure accumulator 28 which form buffer spaces on upper and lower sides of the hydraulic pump 26. Here, the low pressure accumulator 27 installed on the upper side of the hydraulic pump 26 performs an operation of temporarily storing a brake oil returning from the wheel side and supplying toward the hydraulic pump 26, and the high pressure accumulator 28 installed on the lower side of the hydraulic pump 26 performs an operation of temporarily storing the pressurized oil from the hydraulic pump 26 and damping the pulsation of pressure caused by the operation of the hydraulic pump 26. The above devices are controlled by an electric control unit (ECU) (not shown).

That is, the ECU controls the NO and NC type solenoid valves 24 and 25 so that the hydraulic channel configured to supply toward the wheel side is opened or closed, and the operation of the hydraulic pump 26 is also controlled so that the fluid returned toward the low pressure accumulator 27 through the return hydraulic channel is repressurized toward the wheel so that an intermittent braking is performed.

Also, in the above ABS for an vehicle, a brake traction control system (BTCS) configured to prevent a slipping phenomenon between the wheel and the road surface during starting moving the vehicle is provided to smoothly start moving the vehicle.

The BTCS includes an additional hydraulic line 29a configured to connect a hydraulic line on the outlet side of the master cylinder 20 and a hydraulic line on the inlet side of the hydraulic pump 26, and in the hydraulic line 29a, a reciprocation type hydraulic valve 29 installed configured to maintain a default open state and close the channel when a braking pressure is transferred due to a driver pushing a brake pedal 22. This is so that when the driver pushes the brake pedal 22, the braking pressure is only transferred to the wheel side of the vehicle. Also, in the BTCS, a TC type solenoid valve 30 is installed which maintains a default open state on the hydraulic line configured to connect the outlet side of the master cylinder 20 and an outlet side of the high pressure accumulator 28 and blocks the channel when a road slip of the wheel is generated by a rapid start, etc. of the vehicle so that a braking pressure generated by the operation of the hydraulic pump 26 is transmitted toward the wheels. Here, the TC type solenoid valve 30 according to the embodiment of the present invention has a characteristic of opening the opening of a valve and flowing a portion of the oil toward the master cylinder 20 when a pressure of the outlet side channel of the hydraulic pump 26 is greater than or equal to a predetermined pressure.

The solenoid valve for the brake system according to the first embodiment of the present invention is described in detail as a solenoid valve applied to the TC type solenoid valve of the NO type but only an example and may be applied to various solenoid valves.

The solenoid valve for the brake system according to the first embodiment of the present invention will be applied as a TC type solenoid valve for a vehicle and described in detail.

Figure 2:
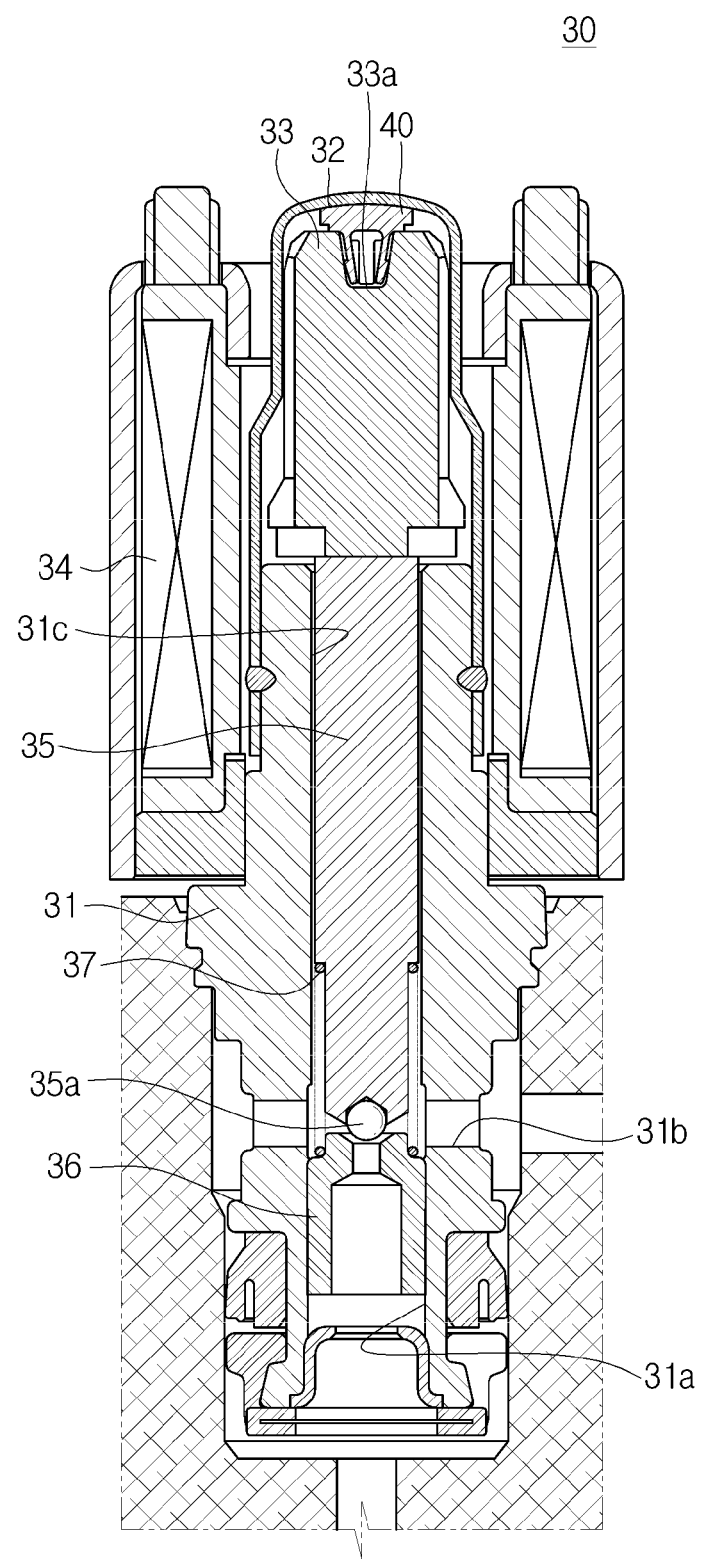
FIG. 2 is a cross-sectional view schematically illustrating the solenoid valve for a brake system according to the first embodiment of the present invention.

FIG. 2 is a cross-sectional view schematically illustrating the solenoid valve for a brake system according to the first embodiment of the present invention.

As shown in FIG. 2, the solenoid valve 30 has a through-hole 31c formed in the center and in the longitudinal direction and includes a magnetic valve core 31 provided thereunder with an inlet 31a and an outlet 31b configured for an inflow and an outflow of oil. Also, a valve dome 32 in a thin cylindrical shape covers and is combined with an upper portion of the valve core 31. Also, an armature 33 having a cylindrical shape capable of advancing and retreating in the longitudinal direction in a predetermined range is installed on an inner surface of the valve dome 32. Also, a magnetic coil 34 in a cylindrical shape configured to receive electric power and advance and retreat the armature 33 covers and is combined with an outer surface of the valve dome 32.

Also, a plunger 35 in a rod shape configured to advance and retreat in the longitudinal direction is installed in the through-hole 31c in the valve core 31, and one end of the plunger 35 is disposed adjacent to a valve seat 36 installed on an inlet 31a of the valve core 31, and the other end is adjacent to the armature 33. Here, a spherical body 35a configured to block a flow of the oil by blocking the channel of the valve seat 36 when the plunger 35 advances by the operation of the armature 33 is combined with the end portion of the plunger 35 adjacent to the valve seat 36. Also, a return spring 37 configured to open the channel by retreating the plunger 35 and the armature 33 when the electric power is not applied to the magnetic coil 34 is installed on the end portion of the plunger 35 adjacent to the valve seat 36. In the return spring 37, one end portion is supported by the valve seat 36 and the other end is supported partially inserted into the end portion of the plunger 35.

Meanwhile, a buffer member 40 configured to decrease vibration and noise generated by collision between the valve dome 32 and the armature 33 when the armature 33 advances and retreats is provided between the armature 33 and the valve dome 32.

Figure 3:
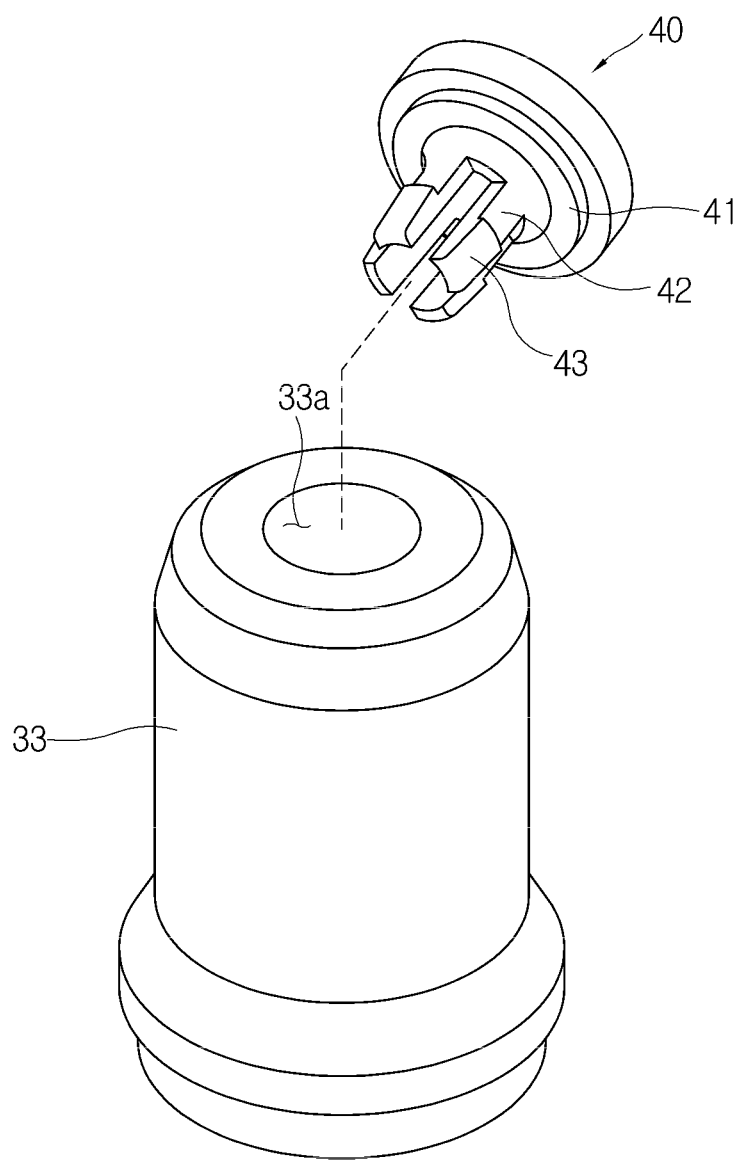
FIG. 3 is an exploded perspective view schematically illustrating a buffer member separated from an armature according to the first embodiment of the present invention.
Figure 4:
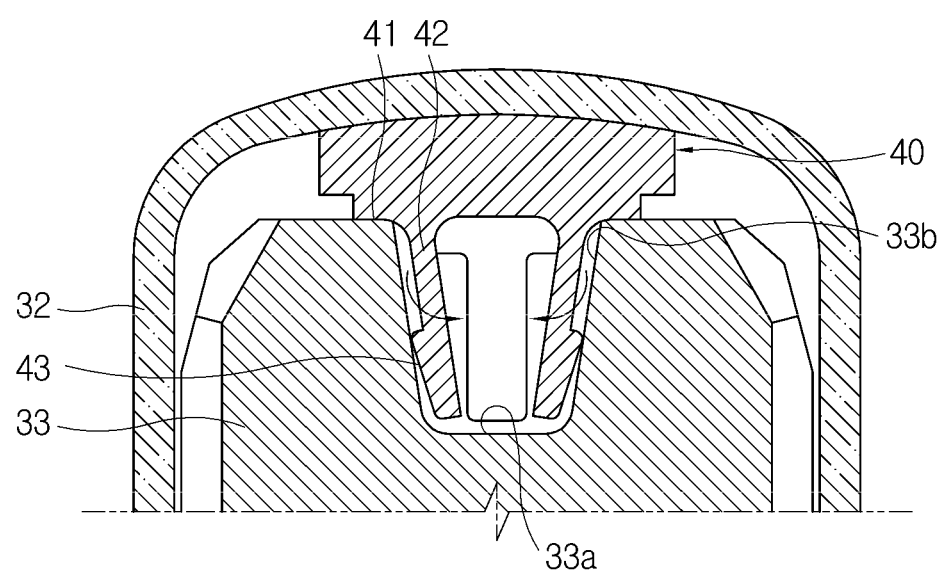
FIG. 4 is a side cross-sectional view schematically illustrating a state of the buffer member when electric power is not applied to the solenoid valve for a brake system according to the first embodiment of the present invention.
Figure 5:
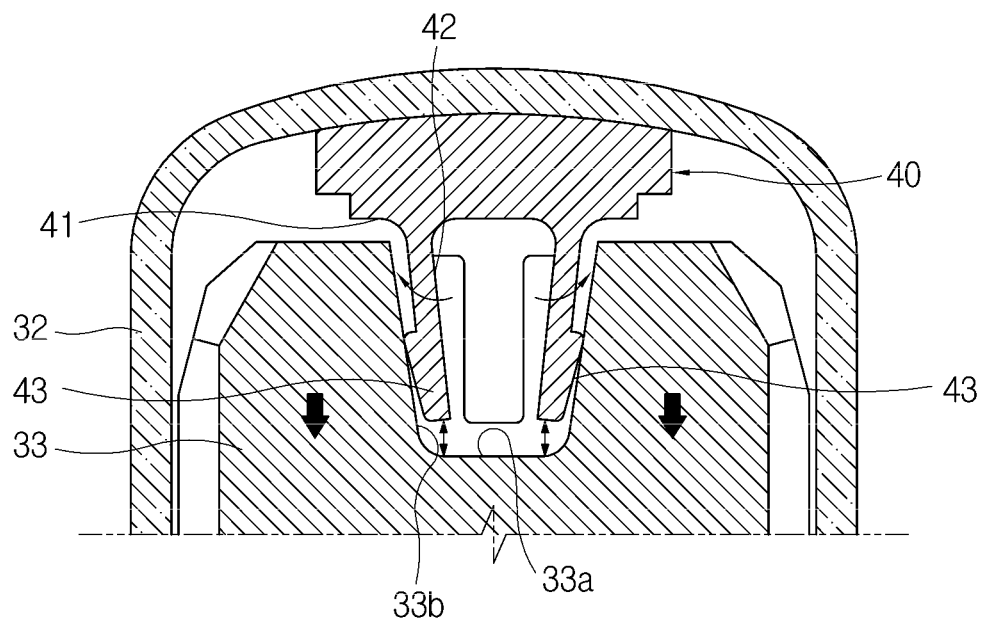
FIG. 5 is a side cross-sectional view schematically illustrating a state of the buffer member when electric power is applied to the solenoid valve for a brake system according to the first embodiment of the present invention.

FIG. 3 is an exploded perspective view schematically illustrating the buffer member 40 that is separated from the armature 33 according to the first embodiment of the present invention, FIG. 4 is a side cross-sectional view schematically illustrating a state of the buffer member 40 when electric power is not applied to the solenoid valve for the brake system according to the first embodiment of the present invention, and FIG. 5 is a side cross-sectional view schematically illustrating a state of the buffer member 40 when electric power is applied to the solenoid valve for the brake system according to the first embodiment of the present invention.

As shown in FIGS. 3 to 5, the buffer member 40 according to the first embodiment of the present invention is provided in a material capable of being elastically deformed so as to be capable of being elastically deformed. An elastic strain of the buffer member 40 may be selected among various materials having various elastic strains by a person skilled in the art and flexibly set.

The buffer member 40 includes a support part 41 configured to buffer and support between an upper surface of the armature 33 and the valve dome 32 and a leg part 42 inserted into an insertion recess 33a provided in the upper surface of the armature 33.

A shape of the support part 41 is not limited thereto and may be provided as a plate which is elastically deformable. Since the support part 41 is elastically deformable, the support part 41 may perform an operation of buffering the collision of the armature 33 and the valve dome 32 when upper and lower surfaces of the support part 41 is compressed by the armature 33 and the valve dome 32.

The support part 41 may perform a its own function regardless of an external diameter thereof, but since the external diameter is provided to be greater than a maximum internal diameter of the insertion recess 33a, the buffer member 40 is stably positioned between the armature 33 and the valve dome 32 for repeated operations of the solenoid valve 30.

The leg parts 42 are provided to protrude from a lower surface of the support part 41 toward a lower direction, and the plurality of leg parts 42 are inserted into an inner surface of the insertion recess 33a by press fitting. That is, the plurality of leg parts 42 are provided to correspond to the shape of the inner surface of the insertion recess 33a and provided to be separated from each other. When the plurality of leg parts 42 are inserted in the insertion recess 33a, each of the leg parts 42 is elastically deformed toward the inner direction and press fitted.

Meanwhile, an elastic restoring force of the leg part 42 is provided to be smaller than an elastic restoring force of the return spring 37. Only when the elastic restoring force of the leg part 42 is provided to be smaller than the elastic restoring force of the return spring 37, the armature 33 may be moved in a direction toward the valve dome 32 due to the elastic restoring force of the return spring 37 when the electric power is applied and afterward shut down.

A protrusion part 43 provided to be protruding may be provided on an outer surface of the leg part 42. The protrusion part 43 is provided for an easy elastic deforming of the leg part 42 when the leg part 42 is inserted into the insertion recess 33a. Since the protrusion part 43 is provided, the leg part 42 may apply more pressure toward the inner surface of the insertion recess 33a, and thus, the buffering performance of the buffer member 40 may be further improved.

The protrusion part 43 according to the first embodiment of the present invention is provided to be inclined for protruding further outward in the upper direction but only as an example and may be protruding in various shapes including protruding in a curved shape, etc., as long as the leg part 42 is easily elastically deformed and the buffering performance of the buffer member 40 may be improved.

Meanwhile, the insertion recess 33a may include an inclined part 33b which has an inclined inner surface of the insertion recess 33a by which the leg part 42 is deformed and fittingly press-inserted when the leg part 42 is received.

The inclined part 33b may be provided such that the inner diameter of the insertion recess 33a may be decreased in the lower direction. That is, inclination of the inclined part 33b may be provided to be narrowed as the insertion recess 33a proceeds in the lower direction.

The inclined angle of the inclined part 33b is not limited and corresponds to an external diameter of the leg part 42, so that the maximum inner diameter of the insertion recess 33a is provided to be a size between a minimum external diameter and the maximum external diameter of the leg part 42.

The provision of an inclined part 33b on the inner surface of the insertion recess 33a according to the first embodiment of the present invention is an example, and, on the contrary, the inclined part 33b may not be provided in the insertion recess 33a but may be provided on the leg part or the inclined parts 33b may be provided on both of the insertion recess 33a and the leg part 42 to perform the same function.

Hereinafter, an operation of the brake system of the vehicle including the solenoid valve 30 for the brake system of the above structure will be described.

When a driver steps on the brake pedal 22, a boosting force is generated by a pressure difference in a boosting device 21, the master cylinder 20 receives the boosting force and a brake hydraulic pressure is formed, and the hydraulic pressure is supplied to the wheel cylinder 23 of each of the wheel sides through the NO type solenoid valve 24, thereby exerting a braking force. Here, when an excessive brake pressure is transferred, a slipping phenomenon in which a tire of the vehicle stops rotating and slips on a road is generated, the slipping phenomenon is sensed by a wheel sensor (not shown) mounted on the wheel side of the vehicle, and the sensed information is transmitted to an ECU (not shown). Here, the ECU opens the NC type solenoid valve 25 and the oil in the master cylinder 20 flows out, and the braking is temporarily released thereby preventing the slipping phenomenon.

Also, the oil discharged through the NC type solenoid valve 25 is moved to the low pressure accumulator 27 and temporarily stored, the oil of the low pressure accumulator 27 is repressurized by an operation of the hydraulic pump 26 and discharged into the high pressure accumulator 28, and the oil of the high pressure accumulator 28 is again supplied to the upper side of the NO type solenoid valve 24, thereby forming a brake pressure. That is, an ABS for a vehicle repeats the above operations by a control of the ECU, and by applying an intermittent brake pressure to the wheel cylinder, a stable braking of the vehicle is achieved.

Meanwhile, regardless of the operation of the brake pedal 22 by the driver, when slipping phenomenon is sensed by a rapid start, etc. of the vehicle, the BTCS operates. In this case, the TC type solenoid valve 30 and the NC type solenoid valve 25 become closed by the control of the ECU, by the operation of the hydraulic pump 26, the brake pressure is applied to the wheel side through the NO type solenoid valve 24. Also, the oil is supplied from the outlet side of the master cylinder 20 to the hydraulic pump 26 through the reciprocation type hydraulic valve 29, and the hydraulic pump 26 presses the oil, thereby performing the braking of the wheel.

During the process of the above operation, when the outlet side brake hydraulic pressure of the hydraulic pump 26 is too high and the braking force applied to the wheel side is too high, the channel of the TC type solenoid valve 30 is opened by the pressure of the outlet side of the hydraulic pump 26, and the oil of the outlet side of the hydraulic pump 26 flows toward the master cylinder 20. Thus, the brake pressure applied to the wheel is suitably maintained, a complete stopping of the wheel is prevented, and thus, the vehicle smoothly starts.

Hereinafter, an operation process of the buffer member 40 of the solenoid valve 30 for the brake system according to the first embodiment of the present invention based on the operation of the solenoid valve 30 will be described.

Referring to FIGS. 2 and 4, electric power is applied to the magnetic coil 34 of the solenoid valve 30, and the armature 33 proceeds toward the valve core 31. By the movement of the armature 33, the armature 33 presses the plunger 35, and since the plunger 35 is moved, the spherical body 35a blocks the orifice provided on the valve seat 36, and an oil flow between the inlet 31a and the outlet 31b is blocked.

Since the armature 33 is moved in the lower direction which is the direction toward the valve core 31, the leg part 42 of the buffer member 40 which is deformed and fittingly press-inserted into the insertion recess 33a is elastically restored and moves in an pullout direction of the insertion recess 33a.

Since the leg part 42 is moved in the pullout direction, the support part 41 which has been pressed between the armature 33 and the valve dome 32 may also be elastically restored. The leg part 42 gets partially out of the insertion recess 33a, and thus, the support part 41 is separated from the upper surface of the armature 33.

That is, when the electric power is applied to the solenoid valve 30, the armature 33 is moved in the lower direction, and the buffer member 40 maintains a state of being partially pulled out from the insertion recess 33a.

Referring again to FIGS. 2 and 5, when the application of the electric power to the magnetic coil 34 of the solenoid valve 30 is released, the armature 33 proceeded toward the valve core 31 is returned by the return spring 37.

When the armature 33 is moved in the valve dome 32 direction by the return spring 37, the upper and lower sides of the buffer member 40 between the armature 33 and the valve dome 32 are pressurized by the armature 33 and the valve dome 32.

Thus, first, the leg part 42 is elastically deformed, elastically pressed and inserted into the insertion recess 33a, and the collision between the armature 33 and the valve dome 32 may be buffered first.

After the leg part 42 is completely inserted into the insertion recess 33a, the armature 33 and the valve dome 32 press the support part 41. Since the support part 41 is elastically deformed, the collision between the armature 33 and the valve dome 32 may be buffered second.

Thus, the buffer member 40 according to the first embodiment of the present invention primarily buffers the collision between the armature 33 and the valve dome 32 by the elastic deformation of the leg part 42, and then by a secondary buffering by the elastic deformation of the support part 41, the collision between the armature 33 and the valve dome 32 is stably buffered, thereby the vibration and noise of the solenoid valve 30 may be effectively decreased.

That is, when the armature 33 returns, the buffer member 40 buffers the impact between the armature 33 and the valve dome 32, and thus, the noise caused by the impact may also be decreased.

Then, a second embodiment of the present invention and a third embodiment of the present invention will be described as other embodiments of the buffer member 40 according to the above-described first embodiment of the present invention will be described. The second and third embodiments of the present invention may perform the same function and performance of buffering the collision between the armature 33 and the valve dome 32 as the above-described first embodiment of the present invention.

In the second and third embodiments of the present invention, configurations other than the detailed configurations and shapes of buffer members 50 and 60 may be the same as the first embodiment of the present invention, and thus, other configurations beside the buffer members 50 and 60 of the second and third embodiments of the present invention may use the same reference numerals as the first embodiment of the present invention, and any detailed description of the configuration will be omitted.

Figure 6:
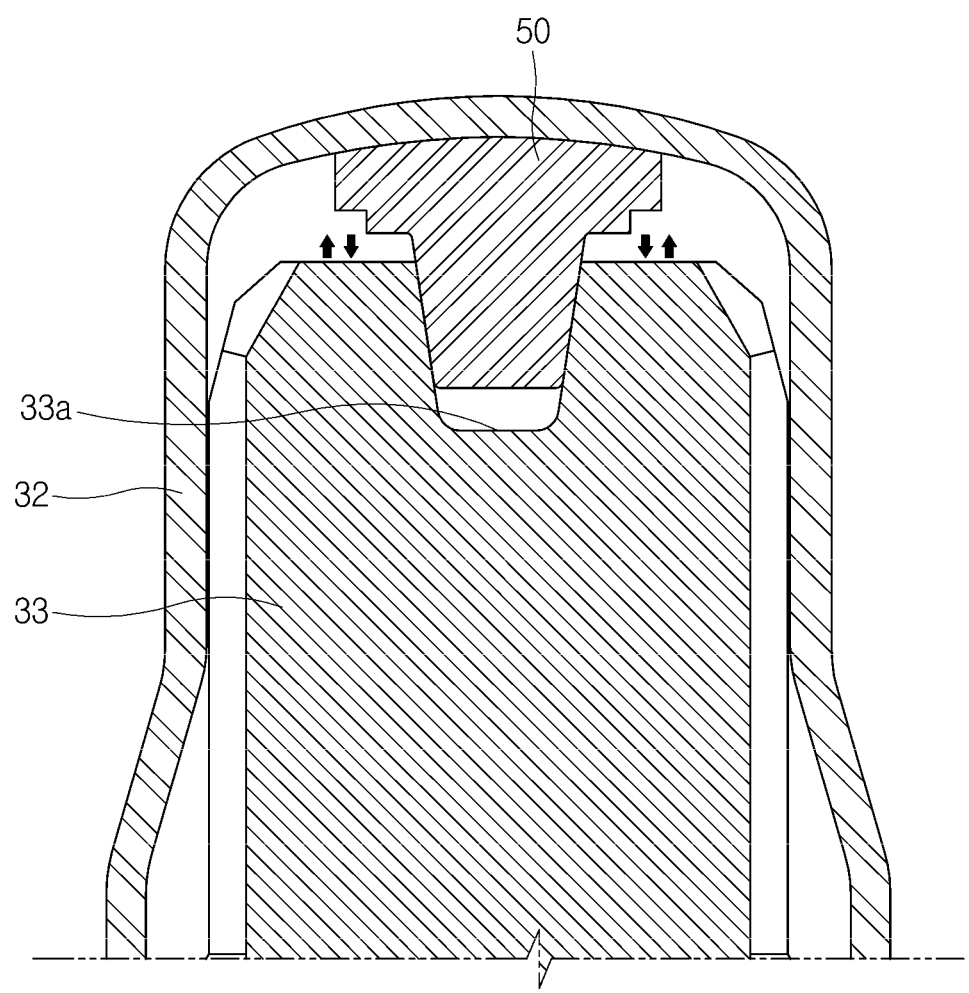
FIG. 6 is a side cross-sectional view schematically illustrating a buffer member of a solenoid valve for a brake system according to a second embodiment of the present invention.

FIG. 6 is a side cross-sectional view schematically illustrating the buffer member 50 of the solenoid valve 30 for the brake system according to the second embodiment of the present invention.

As shown in FIG. 6, the buffer member 50 according to the second embodiment of the present invention may be provided in a cap shape which may be inserted into the insertion recess 33a. That is, in the same configuration as that of the support part of the first embodiment of the present invention, an insertion part protruding to fill the insertion recess 33a in the lower direction may be provided.

The insertion part may have an inclination corresponding to the inclined part 33b provided in the insertion recess 33a, an upper outer diameter thereof may be provided to be greater than an upper inner diameter of the insertion recess 33a, and the insertion part may be elastically deformed and forcibly inserted during inserting the insertion part.

Since the insertion part is elastically deformed and fitted during inserting the insertion part into the insertion recess 33a, the second buffering function may be performed the same as the first embodiment of the present invention. That is, the insertion part is elastically deformed and fittingly press-inserted into the insertion recess 33a, thereby may perform a first buffering, and then, the support part 41 is pressed between the armature 33 and the valve dome 32 and elastically deformed, thereby may perform a second buffering.

The insertion part of the buffer member 50 according to the second embodiment of the present invention is described to have filled inside but only as an example and may be variously provided including having a hollow inside, etc. as long as performing the same function.

Figure 7:
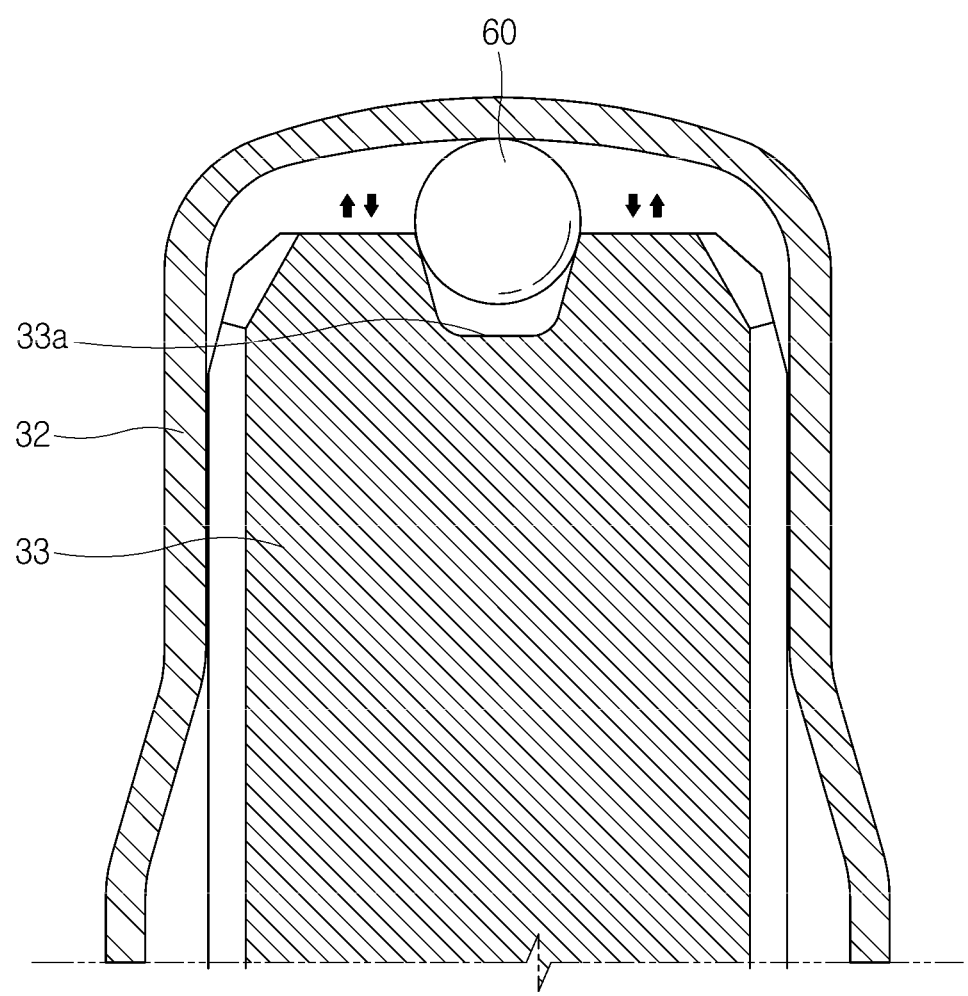
FIG. 7 is a side cross-sectional view schematically illustrating a buffer member of a solenoid valve for a brake system according to a third embodiment of the present invention.

FIG. 7 is a side cross-sectional view schematically illustrating a buffer member 60 of a solenoid valve for a brake system according to a third embodiment of the present invention.

As shown in FIG. 7, the buffer member 60 according to the third embodiment of the present invention may be provided to have a spherical shape.

The buffer member 60 according to the third embodiment may be provided to have a diameter greater than or equal to a maximum inner diameter of the insertion recess 33a. Thus, the buffer member 60 is elastically deformed when an armature 33 is moved in a direction of a valve dome 32 and is fittingly press-inserted into the insertion recess 33a, thereby performing a first buffering.

After the buffer member 60 performs the first buffering, an upper side of the buffer member 60 is interposed between the armature 33 and the valve dome 32. Thus, the upper side of the buffer member 60 receives a pressing force from the armature 33 and the valve dome 32 and is elastically deformed, thereby performing a second buffering.

Thus, the buffer members 40, 50, and 60 according to the first to third embodiments of the present invention may second buffer the collision between the armature 33 and the valve dome 32.

According to the configuration of the buffer member 40 according to one embodiment of the present invention and the function realized by the configuration, the collision between the armature 33 and the valve dome 32 is prevented in the solenoid valve 30 for the brake system, and the noise and vibration may be greatly decreased.

Also, the collision between the armature 33 and the valve dome 32 is prevented, and thus, the durability of the solenoid valve 30 may be improved and the operating performance thereof may be improved.

In the solenoid valve for the brake system according to one embodiment of the present invention, since a buffer member is provided, vibration and noise caused by an impact of the armature on the valve dome during an operation of the solenoid valve may be decreased.

Also, in the buffer member according to one embodiment of the present invention, since a support member and a leg part are prepared, the impact of the armature on the valve dome during an operation of the solenoid valve may be secondarily buffered.

The embodiments of the disclosed present invention have been described, but the disclosed invention is not limited to the above-described specific embodiments. It is possible for those skilled in the art to make various variations within the scope of the invention, and the variations should not be individually understood from the disclosed invention.

What is claimed is:

1. A solenoid valve for a brake system, comprising:
a valve core having an inlet and an outlet;
a valve dome configured to cover one end portion of the valve core;
an armature provided to be advanced and retreated in the valve dome; and
a plunger configured to open or close the inlet of the valve core based on the advance and retreat of the armature,
wherein an upper surface of the armature is recessed to form an insertion recess,
a buffer member configured to buffer an impact between the armature and the valve dome is provided between the armature and the valve dome,
the buffer member includes a support part interposed between the upper surface of the armature and the valve dome and configured to buffer and support the armature and an insertion part connected to the support part and inserted into the insertion recess,
when the armature is moving in an upper direction and closer to the valve dome, an upper surface of the support part is pressurized against the valve dome and the insertion part is elastically deformed in an inner direction of the insertion recess and inserted toward a lower portion of the insertion recess, and
when the armature is moved in a lower direction and away from the valve dome, the insertion part is elastically restored and moved toward an upper portion of the insertion recess and a lower surface of the support part is separated from the upper surface of the armature.

2. The solenoid valve of claim 1, wherein:
when the armature is moved in the upper direction, the lower surface of the support part is in contact with the upper surface of the armature and the support part is elastically compressed between the armature and the valve dome; and
when the armature is moved in the lower direction, the support part is restored elastically.

3. The solenoid valve of claim 1, wherein the insertion part comprises a plurality of legs provided in a radial direction with respect to the center of the insertion recess, and the plurality of legs are elastically deformed in the inner direction of the insertion recess and inserted into the insertion recess.

4. The solenoid valve of claim 1, wherein:
an inner surface of the insertion recess is provided to be inclined so that an inner diameter of the insertion recess is decreased toward the lower portion thereof; and
an outer diameter of the insertion part is provided greater than a maximum inner diameter of the insertion recess toward the upper portion thereof.

* * * * *